United States Patent Office 2,836,597
Patented May 27, 1958

2,836,597

AMIDES OF N-ALKYL TETRAHYDRO-QUINALDINIC ACID

Bo Thuresson af Ekenstam and Borje Per Harald Egner, Bofors, and Bror Gosta Petterson, Karlskoga, Sweden, assignors to Aktiebolaget Bofors, Bofors, Sweden, a corporation of Sweden No Drawing. Application January 18, 1957
Serial No. 634,807

Claims priority, application Sweden January 18, 1956

6 Claims. (Cl. 260—286)

This invention relates to amides of tetrahydroquinaldinic acid; and in particular is directed to the N-alkyl derivative of said acid having the general formula:

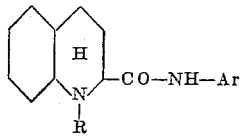

wherein:

R designates an alkyl radical and the symbol Ar designates a 2- or 2,6-substituted benzene ring the said substituents being alkyl radicals.

These novel amides have proved to be very good local anesthetics and also have good surface-anesthetic effect. In respect of toxicity, the effect of this new compound is more advantageous than that of procaine.

The amides of this invention may be prepared by a variety of syntheses. Thus, the amides of tetrahydroquinaldinic acid may be prepared by the interaction of tetrahydroquinaldinic acid derivatives and aromatic amines. They may also be prepared by interaction between tetrahydroquinaldinic acid and isocyanates of aromatic amines. They may also be made by the hydrogenation of aromatic amides of quinaldinic acid. Then, the hydrogen atom attached to the nuclear nitrogen atom of the amides of tetrahydroquinaldinic acid is substituted by an alkyl radical. The free basis obtained are then converted to salts, preferably their hydrogen chlorides.

The amides of this invention can also be prepared by means of the Grignard synthesis.

The following are illustrative examples in accordance with this invention:

Example 1

By the reaction of 191.5 weight parts of quinaldyl chloride with 121 weight parts of 2,6-dimethylaniline in 500 weight parts of dry toluene, first at room temperature which is about 20–25° C. for 10 minutes and thereafter at 80° C. for one hour, a nearly quantitative yield of quinaldyl-2,6-dimethylanilide is obtained.

Through the reduction of this compound in acetic acid with hydrogen gas in the presence of platinum oxide at a pressure of 5 atmospheres and at a temperature of 80° C. there is produced the tetrahydroquinaldyl-2,6-dimethylanilide. 1 weight part tetrahydroquinaldyl-2,6-dimethylanilide is dissolved in 4 parts methanol, in which is suspended 0.5 weight part potash. 0.5 weight part dimethyl sulphate are dripped in during one hour, while the temperature is allowed to rise to 40°. Thereafter a reaction is carried out for 5 hours at 60°. The potash is filtered off and the methanol is distilled off in vacuum. The residue is dissolved in diluted hydrochloric acid and carbon treated, after which the base is precipitated with a 20% solution of caustic soda. The base, which consists of N-methyltetrahydroquinaldyl-2,6-dimethylanilide is filtered off, washed and dried. N-methyl-tetra-hydroquinaldyl-2,6-dimethylanilide is then obtained.

Example 2

By the reaction of 191.5 weight parts of quinaldyl chloride with 121 weight parts of 2-ethyl aniline and the procedure according to Example 1, followed by alkylation with diethyl sulphate, N-ethyl-tetrahydroquinaldyl-2-ethyl anilide is obtained.

Example 3

By the reaction of 191.5 weight parts of quinaldyl chloride with 121 weight parts of 2,6-dimethylaniline and the procedure according to Example 1, followed by alkylation with n-butyl bromide, N-n-butyl tetrahydroquinaldyl-2,6-dimethylanilide is obtained.

Example 4

209.5 weight parts of N-methyl-tetrahydroquinaldyl chloride are first coupled with 125 weight parts of 2,6-dimethylaniline in 500 weight parts of benzene, first under cooling during 10 minutes with water and thereafter through heating to boiling for 1 hour. The N-methyl - tetrahydroquinaldyl - 2,6 - dimethylanilidide-hydrochloride formed thereby, crystalizes out and is filtered off and washed, and purified by reprecipitation.

Example 5

177 weight parts tetrahydroquinaldinic acid are heated together with 295 weight parts 2,6-dimethyl-phenylisocyanate, with good ventilation and stirring at a temperature of 90–110°. The reaction is characterized by an intense evolution of carbonic acid, the cessation of which marks the completed reaction. The excess of isocyanate is distilled off in vacuum. An equivalent quantity of 10–15% hydrochloric acid is added to the reaction residue, which is boiled for 15 minutes, and thereafter cooled and filtered. From the filtrate, tetrahydroquinaldyl-2,6-dimethylanilide is precipitated with sodium hydroxide. The base is filtered off, washed with water, and dried. Through alkylation with dimethylsulphate, N-methyltetrahydroquinaldyl-2,6-dimethylanilide is obtained.

In the novel compounds of this invention, the N-alkyl substituent is preferably a lower alkyl radical having a carbon content up to four carbon atoms. The alkyl substituents of the phenyl radical of the amido moiety are likewise preferably lower alkyl radicals having a carbon content up to two carbon atoms.

It will be understood that the foregoing description of the invention and the examples set forth are merely illustrative of the principles thereof. Accordingly, the appended claims are to be construed as defining the invention within the full spirit and scope thereof.

We claim:

1. Members of the group consisting of N-alkyl 1,2,3,4 tetrahydroquinaldinic acid amides and the pharmaceutically useful acid addition salts thereof wherein the free base form has the general formula:

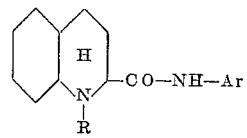

Wherein R designates an alkyl radical and the symbol Ar designates a member of the group consisting of 2-alkyl and 2,6-dialkylbenzene.

2. The N-methyl 1,2,3,4-tetrahydroquinaldyl-2,6-dimethyl anilide.

3. The N-ethyl 1,2,3,4-tetrahydroquinaldyl-2-ethyl anilide.

4. The N-n-butyl 1,2,3,4 tetrahydroquinaldyl-2,6-dimethyl anilide.

5. The N-methyl 1,2,3,4-tetrahydroquinaldyl-2,6-dimethylanilide-hydrochloride.

6. In a method of preparing compounds as defined in claim 1 the step which comprises heating a quinaldyl anilide in the presence of acetic acid, and hydrogen and a platinum oxide catalyst at a temperature of about 80° C. and under a pressure of about 5 atmospheres to form the 1,2,3,4-tetrahydroquinaldinic acid anilide.

References Cited in the file of this patent

Elderfield: Heterocyclic Compounds, vol. IV, New York, John Wiley and Sons (1952), page 282.

Wiselogle: Survey of Anti-Malarial Drugs, 1946, J. W. Edwards, vol. II, part 2, page 1131.